(12) United States Patent
Lu

(10) Patent No.: US 6,898,306 B1
(45) Date of Patent: May 24, 2005

(54) MACHINE-INDEPENDENT ALIGNMENT SYSTEM AND METHOD

(75) Inventor: Shin-Yee Lu, Pleasanton, CA (US)

(73) Assignee: Ultratech, Inc., San Jose, CA (US)

( * ) Notice: Subject to any disclaimer, the term of this patent is extended or adjusted under 35 U.S.C. 154(b) by 623 days.

(21) Appl. No.: 09/855,485

(22) Filed: May 14, 2001

(51) Int. Cl.[7] .................................................. G06K 9/00
(52) U.S. Cl. ........................ 382/151; 382/209; 382/218; 382/219
(58) Field of Search .................................. 382/151, 209, 382/218, 219, 141, 144; 430/22, 394; 356/401; 348/86, 87

(56) References Cited

U.S. PATENT DOCUMENTS

| | | | |
|---|---|---|---|
| 5,621,813 A | | 4/1997 | Brown et al. ................ 382/151 |
| 5,674,650 A | * | 10/1997 | Dirksen et al. ................ 430/22 |
| 5,696,835 A | * | 12/1997 | Hennessey et al. .......... 382/141 |
| 6,483,938 B1 | * | 11/2002 | Hennessey et al. .......... 382/149 |

FOREIGN PATENT DOCUMENTS

EP         0818814 A2 *   1/1998    .......... H01L/21/66

* cited by examiner

*Primary Examiner*—Anh Hong Do
(74) *Attorney, Agent, or Firm*—Allston L. Jones

(57) ABSTRACT

A method of measuring machine alignment offset of an optical machine having an alignment system, so that subsequent processing of substrates on set of optical machines can be performed in a machine-independent manner. The optical machine forms overlayed images of first and second patterns formed on either one or two reticles onto a substrate at respective first and second levels. The method of the invention includes forming a virtual zero-offset alignment pattern and a virtual zero-offset metrology pattern and imaging first and second metrology patterns on the substrate at the first and second levels, respectively. The second metrology pattern is aligned to the first metrology pattern using the zero-offset alignment pattern so that the exposures are performed in an overlayed manner. The first and second metrology patterns are based on the virtual zero-offset metrology pattern. An image of the overlayed first and second metrology patterns formed on the substrate is obtained using the alignment system of the optical machine. The virtual zero-offset metrology pattern is compared to corresponding portions of the image of the overlayed metrology patterns to deduce an offset from an idea alignment of the first and second metrology patterns. Zero-offset alignment patterns for one or more jobs may also be created so that the jobs can be run without an extra step of determining the job-dependent offset for each job.

16 Claims, 9 Drawing Sheets

|     | $M_1$ | $M_2$ | $\cdots$ | $M_n$ |
| --- | --- | --- | --- | --- |
| $J_1$ | $OM_{11}$ | $OM_{12}$ | | $OM_{1n}$ |
| $J_2$ | $OM_{21}$ | $OM_{22}$ | | $OM_{2n}$ |
| $\vdots$ | | | | |
| $J_n$ | $OM_{n1}$ | $OM_{n2}$ | | $OM_{nn}$ |

*Fig. 2 (Prior Art)*

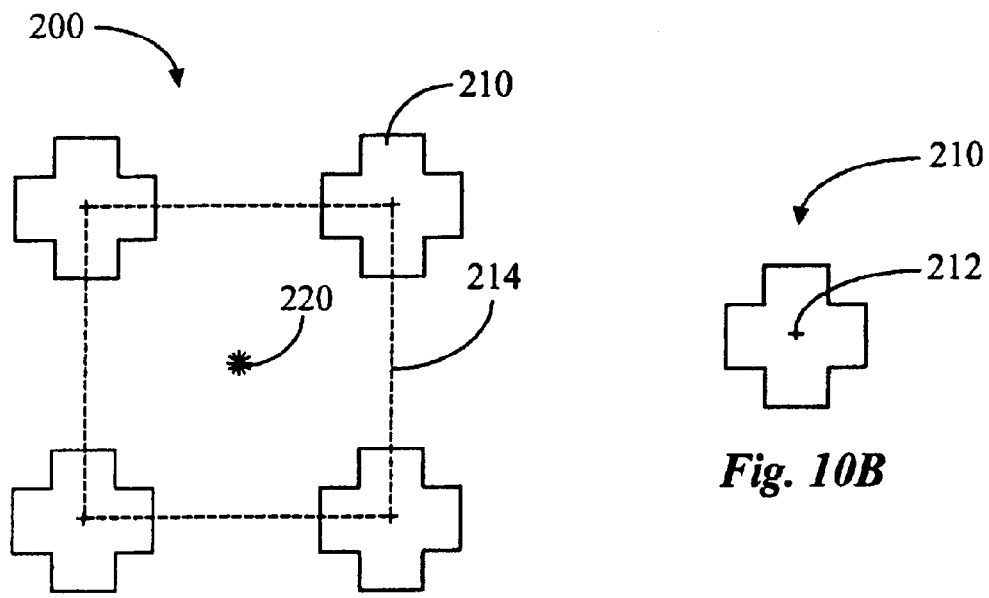
*Fig. 10A*
*Fig. 10B*
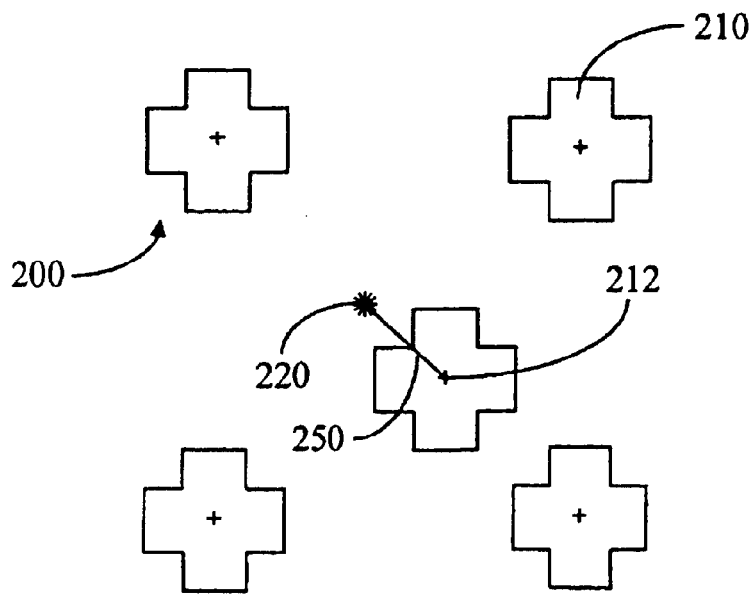
*Fig. 10C*

|     | $M_1$  | $M_2$  | ... | $M_n$  |
|-----|--------|--------|-----|--------|
| $J_1$ | $MO_1$ | $MO_2$ |     | $MO_n$ |
| $J_2$ | $MO_1$ | $MO_2$ |     | $MO_n$ |
| ⋮   |        |        |     |        |
| $J_n$ | $MO_1$ | $MO_2$ |     | $MO_n$ |

*Fig. 11*

MACHINE-INDEPENDENT ALIGNMENT SYSTEM AND METHOD

RELATED APPLICATIONS

The present application is related to commonly assigned U.S. patent application Ser. No. 09/855,486, entitled, "BACKSIDE ALIGNMENT SYSTEM AND METHOD", filed on May 14, 2001, now U.S. Pat. No. 6,525,805.

FIELD OF THE INVENTION

The present invention relates to alignment systems in optical apparatus, and in particular relates to a system and method for characterizing machine alignment offsets for lithography systems to provide for job portability between the lithography systems.

BACKGROUND OF THE INVENTION

In the manufacturing micro-devices (e.g., integrated circuits, thin-film head and ink jet heads) the processing steps include exposing a substrate, such as a semiconductor wafer coated with photosensitive material, using a lithographic exposure system. This exposure requires aligning the substrate residing on a substrate (wafer) stage, to a reticle having a pattern of a particular device layer, and residing on a reticle stage. In this regard, the lithographic system includes an alignment system, such as that disclosed in U.S. Pat. No. 5,621,813 (referred to hereinafter as "the '813 patent"), which patent is incorporated herein by reference. After alignment, the reticle is exposed to radiation to which the photosensitive coating is sensitive, to transfer the reticle pattern onto the wafer. This alignment and exposure can be performed on a variety of lithography systems such as step and repeat, projection, contact and proximity systems, for example. Typically, the first of such device layers is aligned to some marking on the wafer, for example, to a flat or notch, as is well known. Subsequent layers are then aligned relative to this first layer and/or to each other.

Most exposure systems utilize some mechanical means of pre-aligning the wafer, so that the wafer is coarsely aligned to the reticle. The pre-alignment may be, for example, a mechanical means of locating a flat or notch on the wafer. Alternatively, optical sensors may determine the location of the flat, notch, or peripheral edge of the wafer. These methods typically align the wafer to an accuracy of a few hundred microns. After mechanical pre-alignment, the wafer is moved to or near the exposure position by, for example, a wafer-handling arm. Often, after the above-described mechanical alignment, but prior to fine alignment, a pre-alignment using a photoelectric detector is performed. Special optical alignment targets (OATs), produced on the substrate by previous processing steps, are used for this purpose. The OATs are relatively large, so that they can be quickly found after the relatively coarse mechanical pre-alignment. This pre-alignment using the OATs typically aligns the wafer to within approximately ±50 microns or better. At this point, a fine alignment may be performed, by aligning alignment keys on the reticle to alignment targets on the wafer.

The alignment keys and targets are typically on the order of a few microns in size, and provide for alignment to a precision of, for example, 0.15 micron or less, depending upon the requirements of the user. The fine alignment can be performed via a photoelectric detector, such as photomultiple tube or CCD array, which can detect the superposition of special-purpose alignment marks on the reticle and wafer. Based upon the superposition signal level, the detection apparatus sends a signal to move the wafer and/or reticle stage such that the alignment targets on the wafer are in alignment with the alignment keys on the reticle.

The alignment system may be an off-axis system, wherein the wafer is aligned out of the exposure of field of the optical system, then moved to the exposure field with high accuracy to align the wafer to the reticle. Alternatively, the alignment can be performed "through the lens" (TTL) of the optical system. This is also called "on-axis" alignment, and the wafer remains in place during such alignment. Some off-axis alignment systems rely upon aligning the reticle to a mechanical reference built into the lithography system. The substrate is aligned to this mechanical reference as well, and thus to the reticle by commutation. However this scheme requires that the mechanical reference be frequently calibrated for the offset of the substrate to the reticle. Furthermore, very high mechanical stability is required. The TTL technique allow the examination of the actual superposition of reticle image and the substrate for alignment, thereby eliminating the need for a mechanical reference. A TTL system can be configured in a variety of ways, for example, the prior art method of using the projection lens (or a portion of the projection lens) to view the projection of the reticle image onto the substrate. Many alignment systems require scanning, that is, relative motion between the reticle and wafer, which introduces some error.

A problem in present-day lithography practice is that each lithography system has a particular hardware-dependent alignment offset, making it difficult and time-consuming to run different processes on different systems unless the offset is known for the particular tool. Making matters worse is the fact that each "job" has a job-dependent alignment offset. Here, a "job" denotes a different process step carried out on the machine that involves a different reticle to be exposed. Thus, if a particular lithography system used for a given step breaks down, an otherwise available lithography system cannot be used in its place without a great deal of inconvenience in characterizing the offset for the available machine for the particular job that needs to be run.

The prior art method of characterizing alignment offsets for a particular job being run on a particular lithography system (hereinafter, "machine") involves running so-called "send ahead" wafers to measure the alignment offset for each machine and each job. With reference to FIG. 1A, the prior art method involves exposing a first pattern 10 with a center 10C, such as a fairly large box (e.g., 50 microns on a side), at a first location on the wafer. The wafer is then developed, and re-coated with photoresist and re-loaded into the machine. A second pattern 20 with a center 2C, similar or identical to that of pattern 10, is then printed on the wafer at a second location so that its center 20C is precisely displayed from center 10C by a predetermined distance (e.g., 200 microns). This displacement is accomplished by programming the machine to move either the wafer stage or reticle stage (or both) by the predetermined distance 30 (see FIG. 2). This "send ahead" wafer is then sent to an independent alignment measurement tool. The alignment measurement tool measures the precise location of centers 10C and 20C of patterns 10 and 20, respectively, relative to some reference point. From this information, the measurement tool deduces the actual displacement 30' between the respective centers. For a perfect machine, the measured displacement 30 would be identical to that of the programmed displacement 30'. However, with reference to FIG. 1B, in practical actual measured displacement 30 and programmed displacement 30' are different. This different $\underline{\Delta}$ represents the "alignment offset" for the particular combination of machine and job.

The alignment offset can be due to a number of factors, such as differences in viewing at the alignment wavelength of light (which is visible or near-visible) to the actinic light (typically ultraviolet), mechanical calibration, and the sensitivity of the pattern recognition software to the particular alignment pattern ("mark") printed on the wafer. More generally stated, the alignment offset has a machine-dependent hardware contribution and a job-dependent pattern contribution. Thus, with reference to FIG. 2, in order to perform a number of jobs (J1 to Jn) on a number of different machines M1 to Mn, a large number ($n^2$) of offset measurements $OM_9$ need to be performed (one measurement for each machine-job combination) to create a matrix of information relating each job to each machine.

It would be greatly advantageous to have a system for and method of calibrating a lithography system ("machine") that allows a given process ("job") to be run on any machine within a family of machines. A method and system for machine characterization that eliminates the need for time-consuming and costly send-ahead wafers would provide for much desired "job portability" in semiconductor manufacturing.

SUMMARY OF THE INVENTION

The present invention relates to alignment systems in optical apparatus, and in particular relates to a system and method for characterizing machine alignment offsets for lithography systems to provide for job portability between the lithography systems.

Accordingly, a first aspect of the invention is a method of measuring the machine alignment offset of an optical machine having an alignment system. The machine is the kind used to form overlayed images of first and second patterns formed on first and second reticles onto a substrate (e.g., a semiconductor wafer) at respective first and second levels. An example of such an optical machine is a lithographic system. The method comprises the steps of creating one or more virtual zero-offset alignment patterns and one or more virtual zero-offset metrology patterns. A virtual zero-offset pattern is an idealized pattern formed using, for example, a CAD program. The next step includes imaging with the optical machine, using first and second exposures, first and second metrology patterns onto the substrate at the first and second levels, respectively. The exposures are performed in an overlayed manner by aligning the second level to the first level using the zero-offset alignment patterns. The first and second metrology patterns are based on the one or more virtual zero-offset metrology patterns. For example, the first metrology pattern might be a square array of alignment patterns corresponding to the zero-offset pattern, while the second metrology pattern might be just the zero-offset pattern. The overlayed exposures might then consist of forming the second metrology pattern at a particular location (e.g., the center) within the first metrology pattern array. The next step then involves obtaining an image of the overlayed first and second metrology patterns formed on the substrate. The image is obtained using the alignment system of the optical machine. The next step is then comparing the virtual zero-offset metrology pattern (which is preferably stored in memory in an alignment system computer) to corresponding portions of the images obtained with the alignment system to deduce an offset relative to the ideal alignment of the first and second metrology patterns.

A second aspect of the invention is an alignment system capable of measuring a machine offset. The alignment system is preferably part of an optical machine having a machine optical system. The machine optical system is used to form overlayed images of first and second patterns formed on first and second reticles (or on the same reticle) onto a substrate at respective first and second levels. The alignment system comprises a light source and an alignment optical system arranged adjacent the light source. The alignment system is designed such that light from the light source is directed to illuminate a portion of the substrate and pass back through at least a portion of the alignment optical system. The alignment system further includes a detector, such as a CCD camera, capable of detecting images of first and second alignment patterns formed on the substrate at respective first and second levels and illuminated by the alignment system light source. The alignment system also includes a computer system having pattern recognition software stored therein and a memory unit containing one or more virtual zero-offset patterns accessible to the pattern recognition software. At least one of the one or more zero-offset patterns corresponds to the first and second metrology patterns. The computer system is capable of comparing images of the first and second metrology patterns detected by the alignment optical system to at least one of the one or more virtual zero-offset patterns. The first and second metrology patterns are formed on the substrate in an overlayed manner. The comparison is performed to determine the offset between the first and second metrology patterns relative to an ideal overlay of the first and second patterns.

A third aspect of the present invention includes a method of processing wafers in the manufacture of semiconductor devices using a set of two or more machines in a manner that is independent of the type of job being performed on the machine. The method includes the steps of measuring a machine alignment offset for each machine in the set of machines in the manner described briefly above and in more detail below. The next step is then storing the measured machine offsets in the corresponding machines. The next step involves creating zero-offset alignment patterns for each job. The next step then involves processing wafers on any machine in the set of machines without measuring an offset for any machine in the set of machines that depends on the job being performed. This is the "machine-independent" aspect of the present invention, since the performance of a particular job (i.e., the processing of wafers according to a particular recipe) does not depend on what machine in the set of machines is used. Furthermore, it is not necessary to measure the job dependent offset for any job.

BRIEF DESCRIPTION OF THE DRAWINGS

FIG. 2 is a table that illustrates the matrix of offset measurements used in the prior art method of characterizing machines for different jobs to be carried out in the fabrication of a semiconductor device using different machines;

FIG. 10A is a schematic plan view of an exemplary metrology pattern for the first level formed from the composite zero-offset pattern;

FIG. 10B is a schematic plant view of the zero-offset pattern used to form the metrology pattern for the first level, and that serves as the metrology pattern for the second level that is aligned to the first level during overlay measurement;

FIG. 10C is a schematic plan view of the overlay of the first and second metrology patterns of FIG. 10A and FIG. 10B, showing the machine offset that corresponds to the dislocation of the centers of the metrology patterns; and FIG. 11 is a table that illustrates the matrix of offset measurements used in the present invention for characterizing each machine in a set of machines for different jobs to be carried out in the fabrication of a semiconductor device.

DETAILED DESCRIPTION OF THE INVENTION

The present invention relates to alignment systems in optical apparatus, and in particular relates to a system and method for characterizing machine alignment offsets for lithography systems to provide for job portability between the lithography systems. The method and system of the present invention allows for the characterization of the machine or "hardware" offset by eliminating the pattern offset. The present invention is thus applicable for machines having an alignment system that utilizes a machine vision system and corresponding software, such as described in the '813 patent.

Figure 1A:
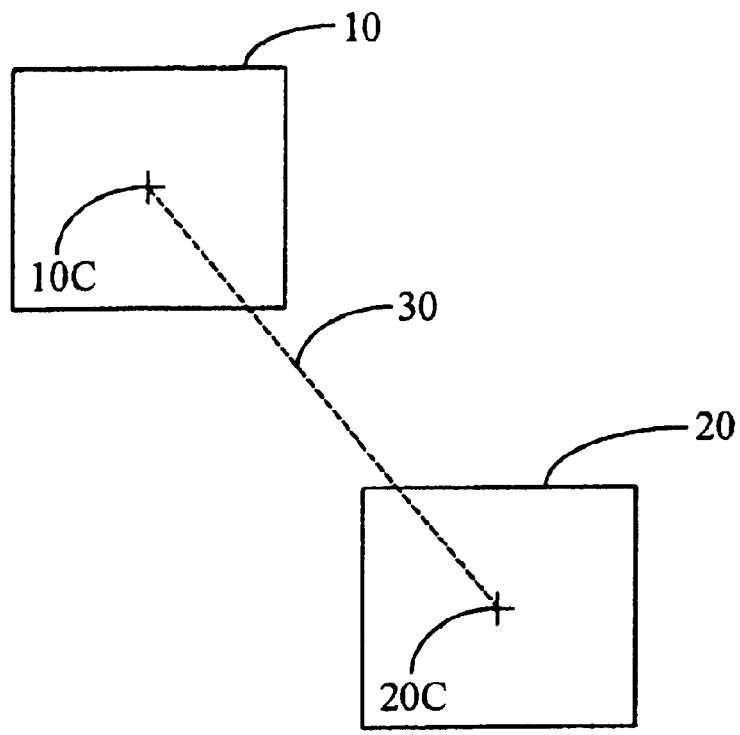
FIG. 1A is a plan view of two metrology patterns printed on a wafer, the patterns displaced by a predetermined amount in the process of measuring overlay.
Figure 1B:
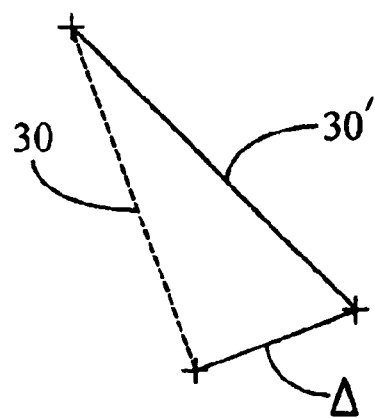
FIG. 1B is a vector diagram of the offset measured between the programmed displacement of the alignment patterns and the actual measured displacement between the alignment patterns.
Figure 3:
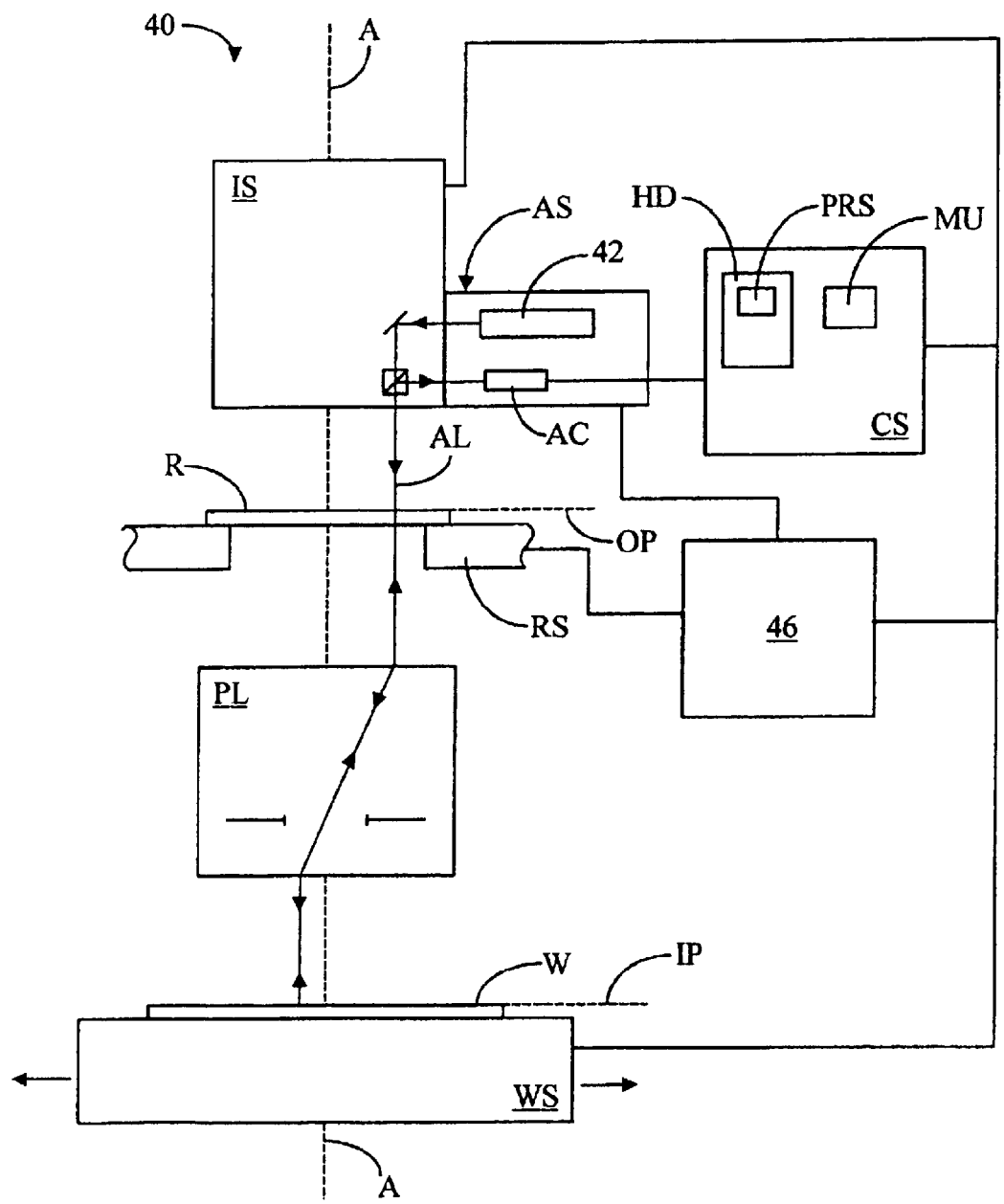
FIG. 3 is a schematic diagram of a lithography system, showing the alignment system and its components.

With reference now to FIG. 3, there is a lithographic system 40, such as the described in detail the '813 patent. System 40 includes, in order along an optical axis A, an illumination system IS that emits light of a select wavelength, a reticle stage RS for supporting a reticle R, a projection lens PL having an object plane and an image plane and arranged to receive light passing through reticle R, and a wafer stage WS. Reticle stage RS supports reticle R, which has formed thereon a pattern (not shown), in object plane OP so that it can be illuminated uniformly with the light from illumination system IS. Wafer stage WS supports a wafer W, coated with photosensitive material, in image plant IP so that an image of the pattern(s) on reticle R are properly formed on the wafer. The photosensitive material on wafer W is sensitive to the select wavelength of light from illumination system IS.

In optical communication with reticle R, projection lens PL and wafer W is an alignment system AS, shown attached to illumination system IS. Alignment system AS directs alignment light AL of a given wavelength (preferably a wavelength different than the exposure wavelength, e.g., 550 nm) from an alignment system light source 42 through reticle R, through projection lens PL, to wafer W, and back to the alignment system. Alignment system AS is thus a TTL system.

Alignment system AS further includes an alignment camera AC, such as a CCD camera, as a detector to detect alignment light AL reflected from wafer W and detected by the alignment system optics (not shown in detail). Alignment system AS also includes a computer system CS having stored therein, e.g., on a hard drive HD, pattern recognition software PRS for processing images of alignment marks imaged onto alignment camera AC by the alignment system optics. Computer system CS further includes a memory unit MU capable of storing information, such as alignment pattern images, to be used by pattern recognition software PRS. System 40 further includes a main control unit 46 electrically connected to illumination system IS, reticle stage RS, wafer stage WS, alignment system AS and computer system CS, for controlling the operation of system 40, including controlling the process of aligning reticle R to wafer W prior to exposing the wafer with actinic light.

In the description below, the word "machine" refers to a lithographic system such as lithographic system 40.

Method of Operation

Figure 4:
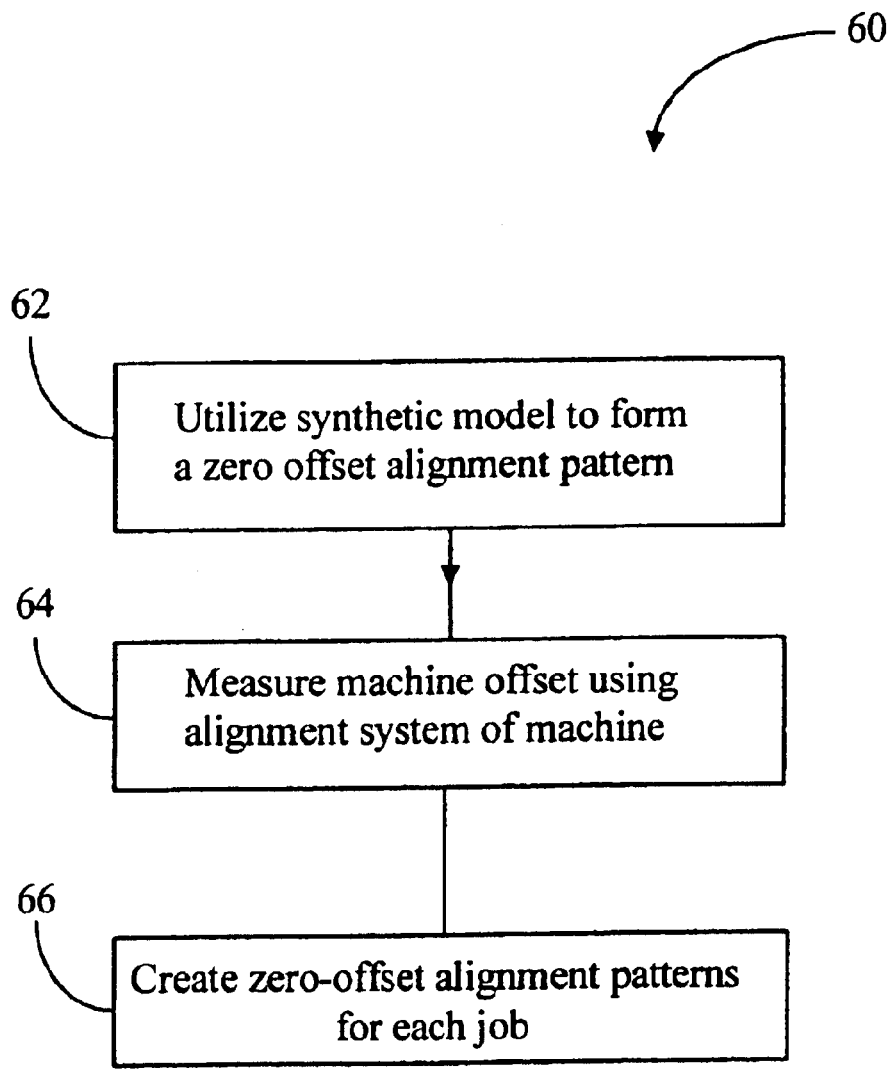
FIG. 4 is a flow diagram of the main method steps for characterizing machine offset according to the present invention.

With reference to the flow diagram 60 of FIG. 4, the method of the present invention includes two main steps, each described in greater detail below. The first step 62 involves creating one or more "synthetic models."A synthetic model is a "zero offset" pattern in a rectangular region ("box"), wherein the centroid (i.e., geometric center) of the box is the geometric center of the pattern. The second step 64 then involves performing a measurement of the component of the alignment offset attributable to the machine using the machine itself, rather than performing overlay measurements on a separate overlay measurement tool.

An additional step in the method of the present invention is step 66 of creating zero-offset alignment patterns for each job. This eliminates the requirement for determining the pattern offset for each job.

Synthetic Model Method

Step 62 involving the formation of zero offset patterns mentioned above in connection with flow diagram 60 of FIG. 4, is now described in more detail with reference to FIGS. 5–8.

Figure 5:
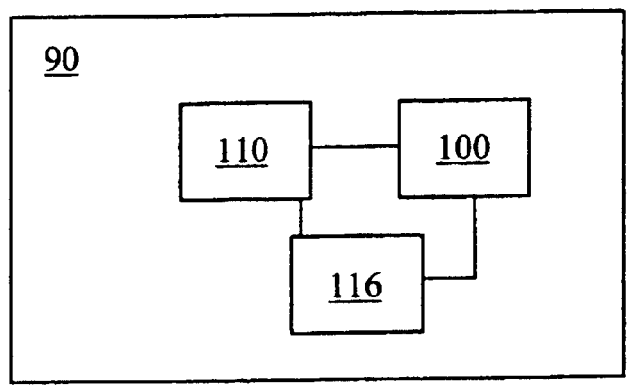
FIG. 5 is a schematic diagram of a computer system having a database, a CAD design program and a memory.
Figure 6:
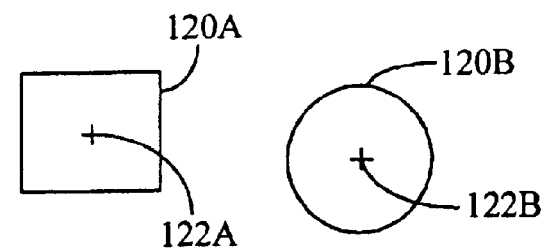
FIG. 6 is a schematic diagram of examples of shape primitives included in the database of FIG. 5.
Figure 6:
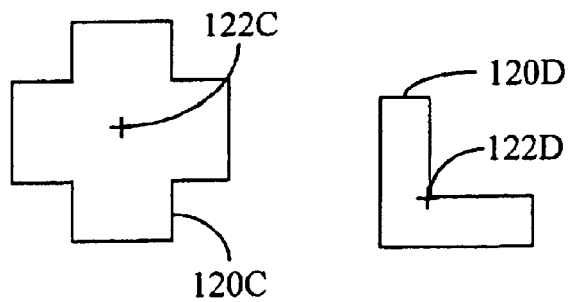
Figure 8:
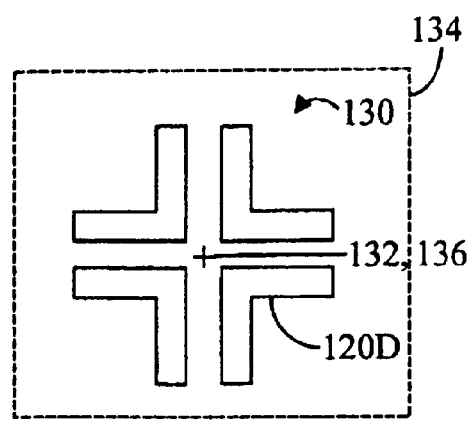
FIG. 8 is an example of a composite zero-offset pattern formed from four shape primitives.

With reference to FIG. 5, the synthetic model of the present invention involves the use of computer system 90 having a pattern database 100 and a computer-aided design (CAD) program 110 that can access database 100. Computer system 90 includes a memory 116. Pattern database 100 stores a set ("palette") of shape primitives 120, such as 120A–120D as shown in FIG. 6, having defined geometric centers 122A–122D, respectively.

Figure 7:
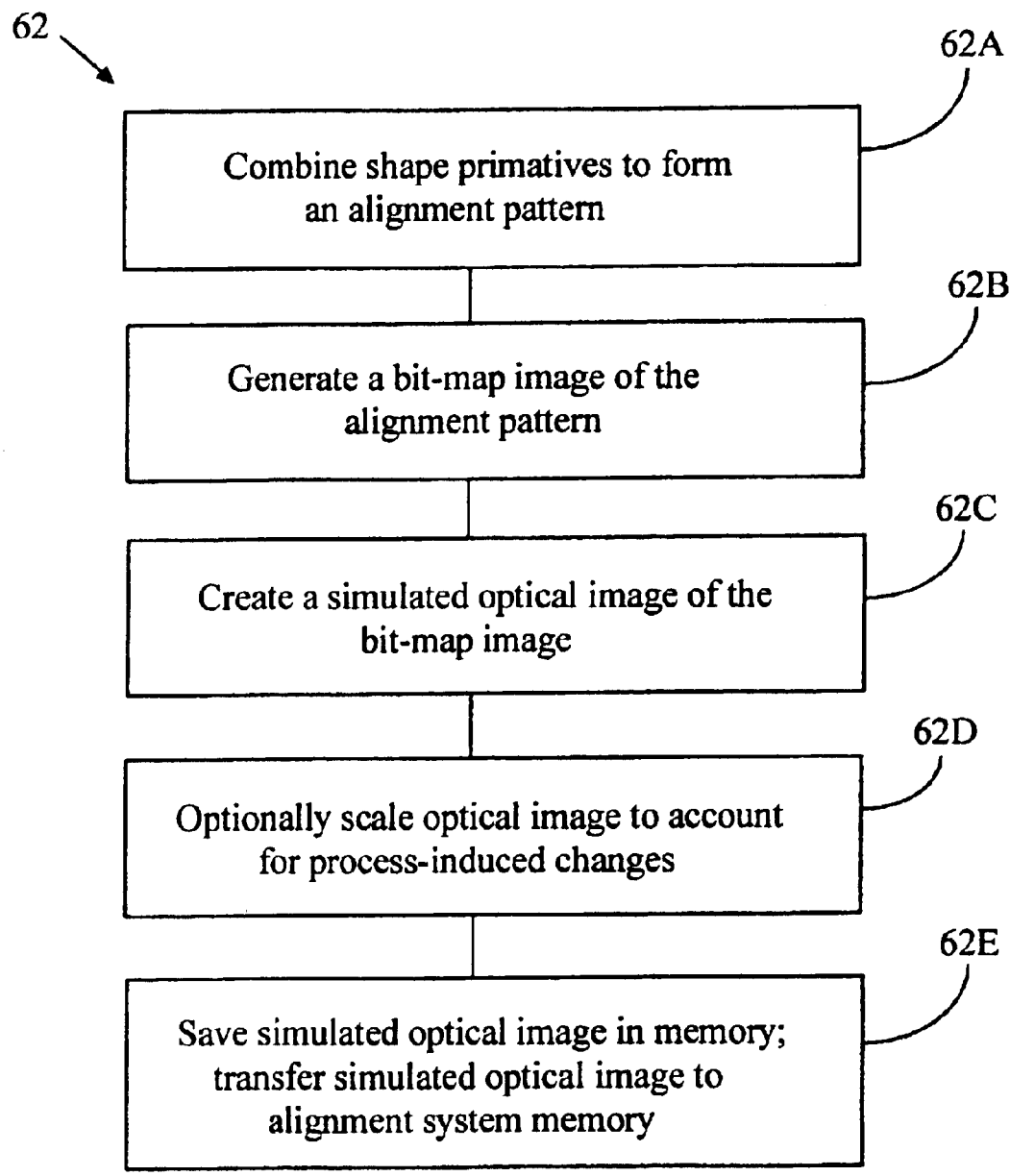
FIG. 7 is a flow diagram of the method steps for forming a digitized simulated image of a composite zero-offset pattern according to the present invention.

With reference to FIG. 7, step 62A of the synthetic model method involves combining shape primitives 120 to form more complex shapes to be used as alignment patterns. An example alignment pattern formed from combining shape primitives 120 is pattern 130 of FIG. 8, which made is up of four shape primitives 120D, and which has a composite geometric center 132. Pattern 130 is formed within a box 134 (dashed line) which also have a geometric center 136 coinciding with geometric center 132. Shape primitives 120 can be overlapped, rotated, or have one or more of its dimensions increased in decreased. The centroid of the alignment pattern can be defined by the CAD program user. Also, the CAD program 110 preferably has the capability of generating and storing in database 100 additional user-defined shape primitives 120, if necessary.

The CAD program 110 is designed with a graphical user interface, which allows the user to select shape primitives 120 and add them to a design sheet. For each element on the design sheet, the user can select features, such as dimensions, center or reference location, relative gray scale value, and edge width. The user also defines the size of box 134 that contains the pattern elements. Everything within box 134 will be used by pattern recognition software (PRS stored in computer system 90 to identify and locate a matching pattern on wafer W. Since the PRS defines the location of a matched pattern based on the box, not the shapes within the box, any separation between the center of the composite shape and the center of the box will register as an alignment offset (the pattern component). For this reason, it is necessary to design the synthetic model such that the geometric center of the composite pattern coincides with the center of the box (see FIG. 8).

The next step 62B in the synthetic model method is digitizing the line-drawn composite alignment pattern to form a bit-map image of the pattern. This is accomplished by CAD software 110, which is also used to define the scale of pixel size to physical size, i.e., the number of pixels per micron. A pattern edge that passes through a pixel (as opposed to corresponding to a pixel edge), is handled by using linear interpolation to obtain sub-pixel resolution of the alignment pattern. A typical pixel resolution for an alignment pattern is about 500 nm per pixel.

With continuing reference to FIG. 7, the next step 62C in the synthetic model method involves creating a simulated optical image of the bit-map image. This is achieved by convolving the bit-map image with the idealized lens optical transfer function (OTF) of the alignment system optics, a technique that is well understood in the art of optics. This step is performed in order to obtain an accurate representation of the alignment pattern image (referred to hereinafter as a "virtual alignment pattern") as formed by the alignment optical system. This virtual alignment pattern is made accessible to the pattern recognition software PRS of the machine (e.g., via memory with MU). This approach of providing a virtual alignment pattern accessible to pattern recognition software PRS is in contrast to prior art methods. In the prior art methods, the pattern recognition software of the alignment system includes only "learned" patterns based on actual images of alignment patterns taken from wafers. The prior art approach results in the pattern recognition software having errors associated with the imaged pattern (which includes machine errors) built into it, thereby preventing the separation of the hardware and software components of the alignment offset.

In addition, a "learned" pattern will by necessity contain a pattern offset: the center of the pattern will not coincide exactly with the center of the box containing the pattern. In measuring alignment offsets on a machine, this pattern offset then becomes combined with the machine's hardware offset. In order to separate the machine offset from the pattern offset, it is necessary to use a zero-offset pattern. The next step 62D involves optionally scaling or rotating the simulated optical image in X or Y to simulate process-induced changes, if such changes are known to occur. Such process-induced changes include scaling due to the application of successive layers of material on top of the initial target in the process of fabricating a device, or rotation of a target due to crystal growth occurring along preferred axes when crystalline layers are grown on the surface of the substrate.

The next step 62E involves saving the simulated optical image as a file stored in memory 116. At some point, this file is transferred to memory unit MU in computer system CS of the machine, so that it is accessible to pattern recognition software PRS.

Measuring Machine Offset

Figure 9:
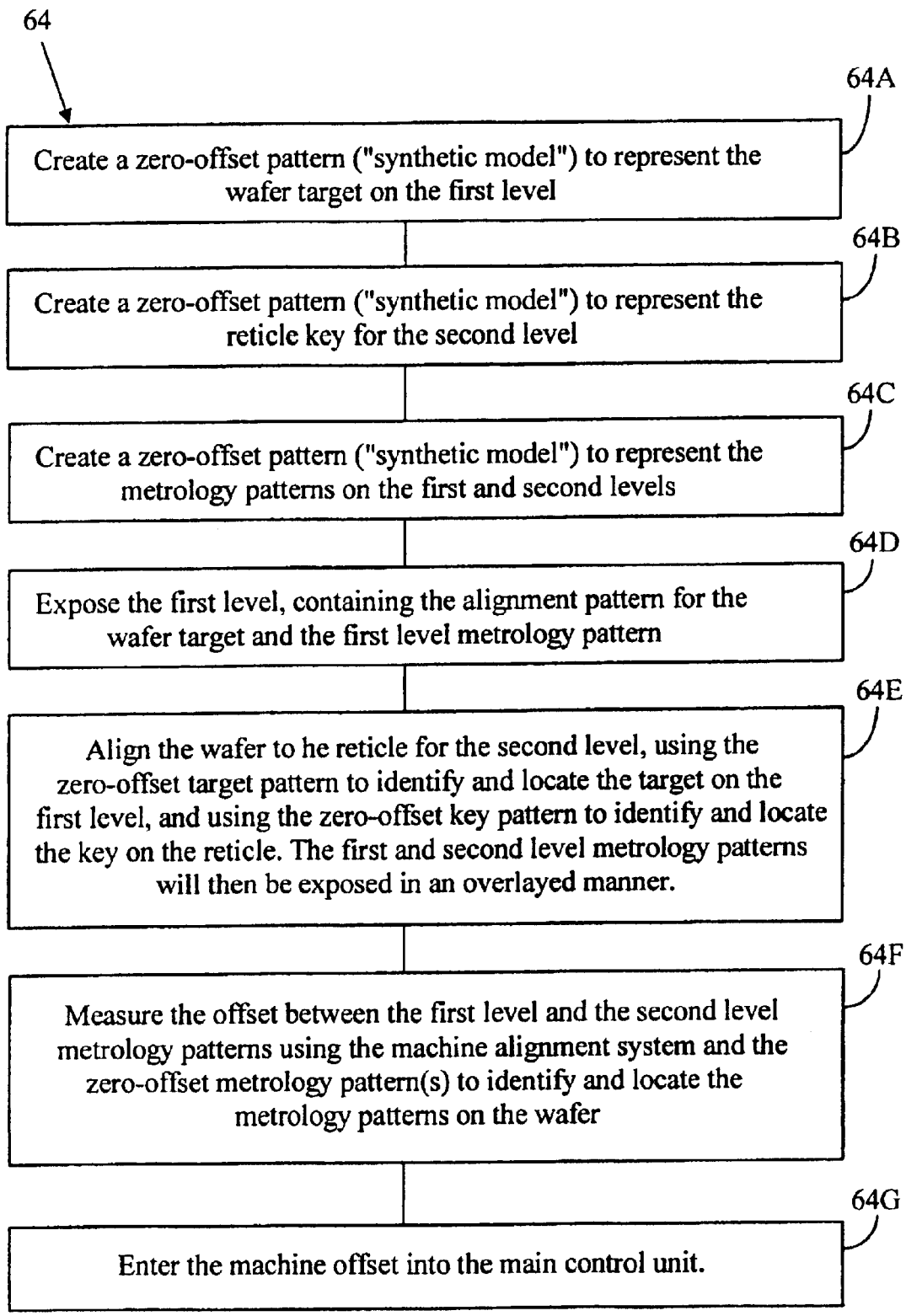
FIG. 9 is a flow diagram of the method steps for measuring the machine offset using the zero-offset patterns of the present invention.

With reference now to FIG. 9 and flow diagram 64 therein, as well as FIGS. 10A–10C, in step 64A the method described above for creating a synthetic model is used to create a zero-offset alignment pattern that represents the feature in the reticle for a first level (level 1) that will be printed on the wafer during the level 1 exposure, and will be used as the wafer target for aligning a second level (level 2) to level 1.

In step 64B, a second zero-offset pattern is created to represent the feature on the reticle for level 2 that will be used as a reticle key for aligning level 2 to level 1.

Next, in step 64C one or more zero-offset patterns are created to represent the features in the level 1 reticle and the level 2 reticle to be printed on the wafer on the first and second levels respectively, and to be used as the metrology patterns.

With reference now also to FIG. 10A, by way of example, a preferred metrology pattern arrangement 200 includes replicating a particular zero offset pattern 210 having a geometric center 212 (FIG. 10B) at four corners of an imaginary square 214, as indicated by the dashed line. Metrology pattern 200 has geometric center 220. In a preferred embodiment, the second metrology pattern is simply the single zero offset pattern that makes up part of the first metrology pattern.

Thus, in step 64D, metrology pattern 200 is imaged onto the wafer on the first level, and the image developed to form the first level metrology pattern on the wafer. The wafer is then re-coated with a new layer of photoresist and is placed back into the machine.

In step 64E, the level 2 reticle is aligned to the first level on the wafer using alignment system AS (FIG. 3) such that the zero-offset alignment pattern for the target is used to locate the target on the wafer, and the zero-offset alignment pattern for the key is used to locate the key on the reticle. When the second level is then exposed on the wafer, the second metrology pattern arrangement is imaged relative to the first metrology pattern to form the composite metrology pattern on the wafer.

With reference to FIG. 10C, in a preferred embodiment, the second metrology pattern is printed so that its geometric center (e.g., center 212) is imaged to the geometric center (e.g., center 220) of the first metrology pattern.

Next, in step 64F, the offset between the first-level and second-level metrology patterns is measured using the machine alignment system AS (FIG. 3). The amount of misalignment 250 between centers 212 and 220 corresponds to the alignment offset. In the present invention, because the second level is aligned to the first level using zero-offset alignment patterns, the misalignment between the first and second metrology pattern centers is entirely attributable to the machine offset. In the prior art method, the alignment offset includes both machine offsets and pattern offsets.

In the present invention, misalignment 250 is measured by alignment system AS of the machine itself, rather than removing the wafer from the machine and making the measurement on a separate metrology tool. This is possible because, in contrast to prior art systems where the alignment system has stored in its computer memory actual images of the patterns, the present invention loads zero-offset images into memory unit MU of alignment system AS. Thus, when alignment system camera AC detects the images of the first and second metrology patterns, the images are processed by pattern recognition software PRS, which then calculates an offset that does not include a component due to pattern offsets caused by the "learning" process. By creating zero-offset images as described above and making them available to the pattern recognition software, the offset that is ultimately measured is attributable to that caused only by the machine itself.

Strictly speaking, measuring the offset on the machine is used for convenience only, and is not required for job portability. However, measuring the offset on the machine does increase the reliability of the result since the machine calculates the offset and automatically stores it. In the prior art method, a user would have to take measurement results from another machine (like an alignment tool, such as those available from KLA-Tencor, San Jose, Calif.), manually calculate the proper offsets, and type them into the machine; a process which introduces many opportunities for error.

With continuing reference to FIG. 9, in step 64G, the measured machine offset is entered into main control unit 46 for future reference, so that when a particular job is run, the machine offset can be recalled and programmed into the machine so that the alignment is performed during a particular job with the machine offset accounted for.

Thus, with reference now to FIG. 11, the present invention includes a method of processing wafers in manufacturing semiconductor devices in a manner that is "job portable." This is accomplished by determining a set of machine offsets $S_{MO}=\{MO1, MO2, \ldots Mn\}$ that includes the machine offset (MO) for a corresponding set $S_M=\{M1, M2, \ldots Mn\}$, of two or more machines M and storing the respective offsets in the corresponding machine, e.g., in memory unit MU (FIG. 3) of each machine, as described above. Wafers corresponding to any one of a number of jobs J in a set of jobs $S_J=\{J1, J2, \ldots Jn\}$ can then be run on any of the machines without having to measure a separate offset corresponding to a particular job J (see FIG. 2). Thus, the number of offset measurements needed to process wafers in manufacturing is thus reduced from $n^2$ to n using the method of the present invention.

To this point, the machine dependence from the jobs has been removed, i.e., any job can, in theory, get the same alignment result on any machine. However, one still needs to measure a job offset for each job, which will be the same for all machines. This results in n+m measurements for n machines and m jobs, unless step 66 (FIG. 4) is included, i.e., creating zero-offset patterns for each job. This eliminates the requirement for determining the pattern offset for each job, and results in only having to make n measurements.

The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. A method of measuring machine alignment offset of an optical machine having an alignment system, the machine used to form overlayed images of first and second patterns formed on a first or first and second reticles onto a substrate at respective first and second levels, the method comprising the steps of:

a) creating one or more virtual zero-offset alignment patterns and one or more virtual zero-offset metrology patterns;

b) imaging with the optical machine, using first and second exposures, first and second metrology patterns on the substrate at the first and second levels, respectively, in an overlayed manner, by aligning the second exposure to the first exposure using the zero-offset alignment patterns, said first and second metrology patterns based on the virtual zero-offset metrology patterns of said step a);

c) obtaining an image of the overlayed first and second metrology patterns formed on the substrate using the alignment system of the optical machine; and d) comparing the virtual zero-offset metrology pattern to corresponding portions of the image obtained in said step c) to deduce an offset from an ideal alignment of the first and second metrology patterns.

2. A method according to claim 1, wherein said step a) includes the step of forming the virtual zero-offset alignment pattern by combining one or more shape primitives from a set of shape primitives.

3. A method according to claim 2, wherein said step a) further includes the steps of:

i) generating a bit-map image of the zero-offset alignment pattern;

ii) creating a simulated optical image of the bit-map image; and iii) saving the simulated optical image as the virtual zero-offset alignment pattern in memory.

4. A method according to claim 3, wherein said step d) includes performing said comparing step using pattern recognition software.

5. A method according to claim 4, wherein said step b) includes forming the first metrology pattern by replicating the zero-offset metrology pattern at the four corners of an imaginary square having a geometric center.

6. A method according to claim 5, wherein said step b) includes imaging the first and second metrology patterns such that the second metrology pattern imaged is as close as possible to the geometric center of the imaginary square.

7. A method according to claim 1 for performing alignment for a plurality of jobs to be performed, further including the step of creating zero-offset alignment patterns for each job.

8. A method of processing wafers in the manufacturing semiconductor devices using a set of two or more machines in a manner that is independent of the job, the method comprising the steps of:

a) measuring a machine alignment offset for each machine in the set of machines according to the method of claim 1;

b) storing the measured machine offsets in the corresponding machines; and c) processing wafers on any machine in the set of machines without measuring an offset for any machine in the set of machines that depends on the job.

9. An alignment system, capable of measuring a machine offset, as part of an optical machine having a machine optical system used to form overlayed images of first and second patterns formed on first and second reticles onto a substrate at respective first and second levels, the alignment system comprising:

a light source;

an alignment optical system arranged adjacent the light source and designed such that light from the light source is directed to illuminate a portion of the substrate and pass back through at least a portion of the alignment optical system;

a detector capable of detecting images of first and second alignment patterns formed on the substrate at respective first and second levels and illuminated by said light source; and a computer system having pattern recognition software stored therein and a memory unit containing one or more virtual zero-offset patterns accessible to said pattern recognition software, at least one of said one or more zero-offset patterns corresponding to the first and second metrology patterns; and at least one of said one or more zero-offset patterns corresponding to the first and second alignment patterns;

wherein said computer system is capable of comparing images of the first and second alignment patterns detected by the alignment optical system to at least one of the one or more virtual zero-offset patterns when the first and second alignment patterns are formed on the substrate in an overlayed manner, so as to determine an amount of offset between the first and second alignment patterns relative to an ideal overlay of the first and second patterns.

10. A system according to claim 9, wherein said alignment optical system includes the machine optical system.

11. A computerized method for measuring the machine offset of a lithographic optical system, the method comprising the steps of:
   a) forming a virtual alignment pattern from a database of primitive shapes and storing the virtual alignment pattern in a memory unit;
   b) comparing first and second images of actual alignment patterns based on said virtual alignment pattern formed on first and second levels of a substrate to said virtual alignment pattern; and
   c) computing an offset between the first and second images of the actual alignment patterns.

12. A method according to claim 11, wherein said step a) includes the steps of:
   i) generating a bit-map image of zero-offset alignment pattern; and
   ii) creating a simulated optical image of the bit-map image.

13. A method according to claim 11, wherein said comparison of said step b) includes the step of performing pattern recognition.

14. A computer-readable medium having computer-executable instructions for performing a method of characterizing a machine alignment offset of an optical machine, the method comprising the steps of:
   a) forming a virtual alignment pattern from a database of primitive shapes and storing the virtual alignment pattern in a memory unit;
   b) comparing first and second images of actual alignment patterns based on said virtual alignment pattern formed on first and second levels of a substrate to said virtual alignment pattern; and
   c) computing an offset between the first and second images of the alignment patterns.

15. A computer-readable medium according to claim 14, wherein the computer-executable instructions further includes the steps, as part of said step a), of:
   i) generating a bit-map image of a zero-offset alignment pattern; and
   ii) creating a simulated optical image of the bit-map image.

16. A computerized method of measuring machine overlay offset of an optical machine having an alignment system, the machine used to form overlayed images of first and second patterns formed on first and second reticles onto a substrate at respective first and second levels, the method comprising the steps of:
   a) forming a virtual zero-offset alignment pattern;
   b) imaging with the optical machine, using first and second exposures, first and second metrology patterns on the substrate at the first and second levels, respectively, in an overlayed manner, said first and second metrology patterns based on the virtual zero-offset metrology pattern of said step a);
   c) obtaining an image of the overlayed first and second patterns formed on the substrate using the alignment system of the optical machine; and
   d) comparing the virtual zero-offset metrology pattern to corresponding portions of the image obtained in said step c) to deduce an offset from an ideal overlay of the first and second metrology patterns.

* * * * *